United States Patent
Van Dyck et al.

(10) Patent No.: US 10,921,454 B2
(45) Date of Patent: Feb. 16, 2021

(54) SYSTEM AND METHOD FOR DETERMINING A DISTANCE TO AN OBJECT

(71) Applicant: XENOMATIX NV, Leuven (BE)

(72) Inventors: Dirk Van Dyck, Aartselaar (BE); Johan Van Den Bossche, Linden (BE)

(73) Assignee: XENOMATIX NV, Leuven (BE)

( * ) Notice: Subject to any disclaimer, the term of this patent is extended or adjusted under 35 U.S.C. 154(b) by 0 days.

(21) Appl. No.: 15/768,591

(22) PCT Filed: Oct. 24, 2016

(86) PCT No.: PCT/EP2016/075589
§ 371 (c)(1),
(2) Date: Apr. 16, 2018

(87) PCT Pub. No.: WO2017/068199
PCT Pub. Date: Apr. 27, 2017

(65) Prior Publication Data
US 2018/0299554 A1  Oct. 18, 2018

(30) Foreign Application Priority Data

Oct. 23, 2015 (EP) .................................... 15191288

(51) Int. Cl.
*G01S 17/18* (2020.01)
*G01S 17/894* (2020.01)
(Continued)

(52) U.S. Cl.
CPC .......... *G01S 17/894* (2020.01); *G01S 7/4814* (2013.01); *G01S 7/4816* (2013.01); *G01S 17/10* (2013.01);
(Continued)

(58) Field of Classification Search
CPC .............................. G01S 17/107; G01S 7/481
See application file for complete search history.

(56) References Cited

U.S. PATENT DOCUMENTS

| 7,544,945 B2 | 6/2009 | Tan et al. |
| 2004/0008394 A1 | 1/2004 | Lange |

(Continued)

FOREIGN PATENT DOCUMENTS

| CN | 202977967 | 6/2013 |
| EP | 2290393 A2 | 3/2011 |

(Continued)

OTHER PUBLICATIONS

Newman et al., "High Peak Power VCSELs in Short Range LIDAR Applications," Journal of Undergraduate Research in PHysics, May 7, 2013.

(Continued)

*Primary Examiner* — Hovhannes Baghdasaryan
(74) *Attorney, Agent, or Firm* — Bacon & Thomas, PLLC

(57) ABSTRACT

A system for determining a distance to an object including a solid-state light source for projecting a pattern of discrete spots of laser light towards the object in a sequence of pulses; a detector having a plurality of picture elements, for detecting light representing the pattern of discrete spots as reflected by the object in synchronization with the pulses; and a processor to calculate the distance to the object as a function of exposure values generated by the picture elements. The picture elements are configured to generate exposure values by accumulating, for each pulse of the sequence, a first amount of electrical charge representative of a first amount of light reflected by the object during a first time window and a second electrical charge representative (Continued)

of a second amount of light reflected by the object during a second time window, the second time window occurring after the first time window.

8 Claims, 12 Drawing Sheets

(51) Int. Cl.
    *G01S 7/481*         (2006.01)
    *G01S 17/10*         (2020.01)
    *G01S 17/86*         (2020.01)
    *G01S 17/931*       (2020.01)
    *G01S 17/42*         (2006.01)
(52) U.S. Cl.
    CPC .............. *G01S 17/18* (2020.01); *G01S 17/86* (2020.01); *G01S 17/931* (2020.01); *G01S 17/42* (2013.01)

(56) References Cited

U.S. PATENT DOCUMENTS

| | | | |
|---|---|---|---|
| 2004/0021057 A1* | 2/2004 | Drowley | G01S 17/36 250/208.1 |
| 2004/0041077 A1 | 3/2004 | Fossum | |
| 2005/0145773 A1 | 7/2005 | Hashimoto et al. | |
| 2007/0158770 A1 | 7/2007 | Kawahito | |
| 2007/0177011 A1 | 8/2007 | Lewin | |
| 2007/0177841 A1 | 8/2007 | Danziger | |
| 2010/0231891 A1 | 9/2010 | Mase | |
| 2012/0038903 A1 | 2/2012 | Weimer et al. | |
| 2012/0200841 A1 | 8/2012 | Kamiyama | |
| 2013/0148102 A1 | 6/2013 | Oggier | |
| 2014/0253758 A1 | 9/2014 | Metz | |
| 2014/0353472 A1 | 12/2014 | Dierickx | |
| 2015/0063387 A1 | 3/2015 | Joseph et al. | |
| 2015/0097947 A1 | 4/2015 | Hudman et al. | |
| 2015/0144790 A1 | 5/2015 | Veilchko | |
| 2015/0253429 A1 | 9/2015 | Dorrington | |
| 2015/0260830 A1 | 9/2015 | Ghosh | |
| 2015/0319347 A1 | 11/2015 | Cottrell | |
| 2015/0341573 A1 | 11/2015 | Matsuo et al. | |
| 2016/0259057 A1 | 9/2016 | Ito | |
| 2016/0266255 A1 | 9/2016 | Nishikawa | |
| 2016/0295122 A1 | 10/2016 | Ishii | |
| 2016/0295133 A1 | 10/2016 | Rudmann | |
| 2017/0171485 A1 | 6/2017 | Kawahito et al. | |
| 2018/0045513 A1 | 2/2018 | Kitamura et al. | |
| 2018/0053799 A1 | 2/2018 | Otani | |

FOREIGN PATENT DOCUMENTS

| | | |
|---|---|---|
| EP | 2290402 A1 | 3/2011 |
| EP | 2322953 A1 | 5/2011 |
| EP | 2634595 A1 | 9/2013 |
| EP | 3159711 A1 | 4/2017 |
| JP | 2006516324 A | 6/2006 |
| JP | 2007333746 A | 12/2007 |
| JP | 2012083220 A | 4/2012 |
| WO | 2004012269 A1 | 2/2004 |
| WO | 2004071074 A1 | 8/2004 |
| WO | 2014122714 A1 | 8/2014 |
| WO | 2015004213 A1 | 1/2015 |
| WO | 2015075926 A1 | 5/2015 |
| WO | 2015118884 A1 | 8/2015 |
| WO | 2015162278 A1 | 10/2015 |
| WO | 2016020073 A1 | 2/2016 |
| WO | 2016076796 A1 | 5/2016 |

OTHER PUBLICATIONS

Kawahito et al., "A CMOS Time-of-Flight Range Image Sensor with Gates-on-Field-Oxide Structure," IEEE Sensors Journal, vol. 7, No. 12, p. 1578-1586, Dec. 2007.
International search report for PCT/EP2016/075589 dated Feb. 10, 2017.
Written Opinion for PCT/EP2016/075589 dated Feb. 10, 2017.
Second Written Opinion for PCT/EP2016/075589 dated Sep. 21, 2017.
Stoppa et al.,"An 80*60 range image sensor based on 10[micro]m 50MHz lock-in pixels in 0.18[micro]m CMOS," Solid-State Circuits Conference Digest of Technical Papers (ISSCC), 2010 IEEE International IEEE, Feb. 7, 2010, pp. 406-407.
Extended Search Report for corresponding European app. 15191288.8-1812 dated Apr. 28, 2016.
International Preliminary Report on Patentability for PCT/EP2016/075589 dated Jan. 8, 2018.
EP Office Action in related EP Application No. 16794954.4, dated Oct. 25, 2018.
European Summons to Attend Oral Proceedings in corresponding European Application No. 16794954.4-1206/3365700, dated Apr. 26, 2019.
Buttgen B et al: "Pseudonoise Optical Modulation for Real-Time 3-D Imaging With Minimum Interference", IEEE Trans. on Circuits and Systems, vol. 54, No. 10, Oct. 2007.
Michael C Y Huang et al: "Monolithic Integrated Piezoelectric MEMS-Tunable VCSEL", IEEE Journal of Selected Topics in Quantum Electronics, vol. 13, No. 2, Mar./Apr. 2007.
European Result of Consultation in corresponding European Application No. 16794954.4-1206, dated Dec. 13, 2019.
European Oral Proceeding Minutes in corresponding European Application No. 16794954.4, dated Mar. 10, 2020.
European Intention to Grrant in corresponding European Application No. 16794954.4, dated Mar. 16, 2020.
U.S. Office Action in corresponding U.S. Appl. No. 16/337,331, dated Mar. 13, 2020.
Notice of Allowability in corresponding U.S. Appl. No. 16/625,827 dated Apr. 20, 2020.
JP Office Action in corresponding JP Application No. 2018-514329, dated Dec. 1, 2020.

\* cited by examiner

SYSTEM AND METHOD FOR DETERMINING A DISTANCE TO AN OBJECT

FIELD OF THE INVENTION

The present invention pertains to the field of systems for determining a distance to an object, in particular to time-of-flight based sensing systems to be used for the characterization of a scene or a part thereof.

BACKGROUND

In the field of remote sensing technology, mainly in the usage of making high-resolution maps of the surroundings, to be used in many control and navigation applications such as but not limited to the automotive and industrial environment, gaming applications, and mapping applications, it is known to use time-of-flight based sensing to determine the distance of objects from a sensor. Time-of-flight based techniques include the use of RF modulated sources, range gated imagers, and direct time-of-flight (DToF) imagers. For the use of RF modulated sources and range gated imagers, it is necessary to illuminate the entire scene of interest with a modulated or pulsed source. Direct time-of-flight systems, such as most LIDARs, mechanically scan the area of interest with a pulsed beam, the reflection of which is sensed with a pulse detector.

In order to be able to correlate an emitted RF modulated signal with the detected reflected signal, the emitted signal must meet a number of constraints. In practice, these constraints turn out to make the RF modulated systems highly impractical for use in vehicular systems: the attainable range of detection is very limited for signal intensities that are within conventional safety limits and within the power budget of regular vehicles.

A direct TOF (DToF) imager, as used in most LIDAR systems, comprises a powerful pulsed laser (operating in a nanosecond pulse regime), a mechanical scanning system to acquire from the 1D point measurement a 3D map, and a pulse detector. Systems of this type are presently available from vendors including Velodyne Lidar of Morgan Hill, Calif. The Velodyne HDL-64E, as an example of state-of-the-art systems, uses 64 high-power lasers and 64 detectors (avalanche diodes) in a mechanically rotating structure at 5 to 15 rotations per second. The optical power required by these DToF LIDAR systems is too high to be obtained with semiconductor lasers, whose power is in the range of five to six orders of magnitude lower. In addition, the use of mechanically rotating elements for scanning purposes limits the prospects for miniaturization, reliability, and cost reduction of this type of system.

United States Patent application publication no. 2015/0063387 in the name of Trilumina discloses a VCSEL delivering a total energy of 50 mW in a pulse having a pulse width of 20 ns. The commercially available Optek OPV310 VCSEL delivers a total energy of 60 mW in a pulse having a duration of 10 ns and it can be estimated by extrapolation to have a maximum optical output power of 100 mW. This value is only realized under very stringent operating conditions, meaning optimal duty cycle and short pulse width so as to avoid instability due to thermal problems. Both the Trilumina disclosure and the Optek system illustrate that continuous-wave VCSEL systems are reaching their physical limits with respect to optical peak power output, due to thermal constraints inherently linked to the VCSEL design. At these pulse energy levels, and using ns pulses as presently used in DToF applications, the mere number of photons that can be expected to be usefully reflected by an object at a distance of 120 m is so low that it defeats detection by means of conventional semiconductor sensors such as CMOS or CCD or SPAD array. Thus, increasing the VCSEL power outputs by 5 or 6 orders of magnitude, as would be required to extend the range of the known DToF systems, is physically impossible.

Even the use of avalanche diodes (AD or SPAD), which are theoretically sufficiently sensitive to capture the few returning photons, cannot be usefully deployed in the known LIDAR system architectures. A solid state implementation of an array of SPADs must be read out serially. A high number of SPADs is required to achieve the desired accuracy. The serial read-out constraints of the solid state implementation limits the bandwidth of the system turning it inappropriate for the desired accuracy. For accuracies such as that of the Velodyne system (0.02 m to 0.04 m, independent of distance), the required read-out data rate exceeds the practically achievable bandwidth in case of today's IC implementation. For operation at 120 m, a SPAD array of 500×500 pixels is required, which, in an IC-based implementation, must be read-out serially. For the same precision as the aforementioned Velodyne system, it would require 1000 pulses per millisecond and hence 1000 frames per millisecond, translating into a readout rate of 250 Gigapixels per second. This is believed to be technically unfeasible in the context of current SPAD IC technology.

The paper by Neil E. Newman et al., "High Peak Power VCSELs in Short Range LIDAR Applications", *Journal of Undergraduate Research in Physics*, 2013, http://www.jurp.org/2013/12017EXR.pdf, describes a VCSEL-based LIDAR application. The paper states that the maximum output power of the described prototype system was not great enough to do wide-field LIDAR at a range greater than 0.75 m. With a relatively focused beam (0.02 m spot size at 1 m distance), the authors were able to range a target object at a distance of up to 1 m.

The above examples clearly indicate that the optical power emitted by present semiconductor lasers cannot meet the power requirements necessary for operations in the known LIDAR systems to be of practical use in automotive applications (e.g. for ranges up to 120 m).

U.S. Pat. No. 7,544,945 in the name of Avago Technologies General IP (Singapore) Pte. Ltd., discloses vehicle-based LIDAR systems and methods using multiple lasers to provide more compact and cost-effective LIDAR functionality. Each laser in an array of lasers can be sequentially activated so that a corresponding optical element mounted with respect to the array of lasers produces respective interrogation beams in substantially different directions. Light from these beams is reflected by objects in a vehicle's environment, and detected so as to provide information about the objects to vehicle operators and/or passengers. The patent provides a solid state projector in which the individual lasers are consecutively activated in order to replace the known mechanical scanning in the known DToF LIDAR systems.

A high-accuracy medium-range surround sensing system for vehicles that does not use time-of-flight detection, is known from international patent application publication WO 2015/004213 A1 in the name of the present applicant. In that publication, the localization of objects is based on the projection of pulsed radiation spots and the analysis of the displacement of detected spots with reference to predetermined reference spot positions. More in particular, the system of the cited publication uses triangulation. However, the accuracy that can be achieved correlates with the triangulation base, which limits the further miniaturization that can be achieved.

US patent application publication no. US 2012/0038903 A1 discloses methods and systems for adaptively controlling the illumination of a scene. In particular, a scene is illuminated, and light reflected from the scene is detected. Information regarding levels of light intensity received by different pixels of a multiple pixel detector, corresponding to different areas within a scene, and/or information regarding a range to an area within a scene, is received. That information is then used as a feedback signal to control levels of illumination within the scene. More particularly, different areas of the scene can be provided with different levels of illumination in response to the feedback signal.

European patent application publication no. EP 2 322 953 A1 discloses a distance image sensor capable of enlarging the distance measurement range without reducing the distance resolution. A radiation source provides first to fifth pulse trains which are irradiated to the object as radiation pulses in the first to fifth frames arranged in order on a time axis. In each of the frames, imaging times are prescribed at points of predetermined time from the start point of each frame, also the pulses are shifted respectively by shift amounts different from each other from the start point of the first to fifth frames. A pixel array generates element image signals each of which has distance information of an object in distance ranges different from each other using imaging windows A and B in each of five frames. A processing unit generates an image signal by combining the element image signals. Since five times-of-flight measurement are used, the width of the radiation pulse does not have to be increased to obtain distance information of the object in a wide distance range, and the distance resolution is not reduced.

European patent application publication no. EP 2 290 402 A1 discloses a range image sensor which is provided on a semiconductor substrate with an imaging region composed of a plurality of two-dimensionally arranged units, thereby obtaining a range image on the basis of charge quantities output from the units. One of the units is provided with a charge generating region (region outside a transfer electrode) where charges are generated in response to incident light, at least two semiconductor regions 3 which are arranged spatially apart to collect charges from the charge generating region, and a transfer electrode 5 which is installed at each periphery of the semiconductor region 3, given a charge transfer signal different in phase, and surrounding the semiconductor region 3.

The article by Shoji Kawahito et al., "A CMOS Time-of-Flight Range Image Sensor With Gates-on-Field-Oxide Structure", IEEE Sensors Journal, Vol. 7, no. 12, p. 1578-1586, discloses a type of CMOS time-of-flight (TOS) range image sensor using single-layer gates on field oxide structure for photo conversion and charge transfer. This structure allows the realization of a dense TOF range imaging array with 15×15 µm² pixels in a standard CMOS process. Only an additional process step to create an n-type buried layer which is necessary for high-speed charge transfer is added to the fabrication process. The sensor operates based on time-delay dependent modulation of photocharge induced by back reflected infrared light pulses from an active illumination light source. To reduce the influence of background light, a small duty cycle light pulse is used and charge draining structures are included in the pixel. The TOF sensor chip fabricated measures a range resolution of 2.35 cm at 30 frames per second as an improvement to 0.74 cm at three frames per second with a pulsewidth of 100 ns.

There is a continuing need to obtain extreme miniaturization and/or longer-range in complex vehicular surround sensing applications, such as ADAS (autonomous driving assistance system) applications and autonomous driving applications, and this at a reasonable cost and in a compact, semiconductor-integrated form factor.

SUMMARY OF THE INVENTION

It is an objective of embodiments of the present invention to provide a further miniaturized and longer-range alternative for displacement-based vehicular surround sensing systems. Furthermore it is an objective of embodiments of the present invention to provide a full solid-state alternative for the known LIDAR systems.

According to an aspect of the present invention, there is provided a system for determining a distance to an object comprising: a solid-state light source arranged for projecting a pattern of discrete spots of laser light towards the object in a sequence of pulses; a detector comprising a plurality of picture elements, the detector being configured for detecting light representing the pattern of discrete spots as reflected by the object in synchronization with said sequence of pulses; and processing means configured to calculate the distance to the object as a function of exposure values generated by said picture elements in response to said detected light; wherein the picture elements are configured to generate said exposure values by accumulating, for each pulse of said sequence, a first amount of electrical charge representative of a first amount of light reflected by said object during a first predetermined time window and a second electrical charge representative of a second amount of light reflected by said object during a second predetermined time window, said second predetermined time window occurring after said first predetermined time window.

The present invention relies on the same physical principles as direct time-of-flight based ranging systems, viz. the fact that light always takes a certain amount of time to travel a given distance. However, the present invention uses range gating to determine the distance travelled by a light pulse that has been transmitted and subsequently reflected by a target object. The present invention is inter alia based on the insight of the inventors that by combining range gating, an at least partially simultaneous spot pattern projection (based on a novel illumination scheme) and a low-power semiconductor light source, a substantially miniaturized, full solid state and energy-efficient long-range distance detection method can be obtained. The term "pattern" as used herein refers to a spatial distribution of simultaneously projected spots. In order to determine the position of the detected spot reflection in three-dimensional space, it is necessary to combine the distance information obtained from the ranging step with angular information to fix the remaining two spatial coordinates. A camera comprising a pixel array and suitably arranged optics can be used to provide the additional angular information, by identifying the pixel in which the reflection is detected.

Embodiments of the present invention are based on the further insight of the inventors that in order to be able to use spot patterns generated by solid-state light sources in a LIDAR system at the desired ranges, a way to circumvent the optical power limitations is needed. The inventors have found that by prolonging the pulse duration and by integrating the reflected energy of multiple VCSEL-generated light pulses within at least two semiconductor sensor wells or within at least two pixels, followed by a single read-out of the integrated charge, a solid-state LIDAR system can be obtained with a significantly greater operating range than is currently possible with solid-state implementations. Hereinafter, the term "storage" will be used to designate the well or the pixel in which charge is accumulated in response to the detection of photons.

It is an advantage of the present invention that the solid-state light source and the solid-state sensor (such as a CMOS sensor, a CCD sensor, SPAD array or the like) may be integrated on the same semiconductor substrate. The solid-state light source may comprise a VCSEL array or a laser with a grating adapted to produce the desired pattern.

Moreover, by assessing the reflected light energy detected in two consecutive time windows, and normalizing for the total accumulated charge in the two consecutive windows, the impact of varying reflectivity of the object under study and the contribution of ambient light can adequately be accounted for in the distance calculation algorithm.

In the picture elements, charge representative of the impinging light can be accumulated at well level or at pixel level. An advantage of charge accumulation at the well level is that read-out noise is minimized, leading to a better signal-to-noise ratio.

The transmission and detection of the sequence of pulses may be repeated periodically.

In an embodiment of the system according to the present invention, the first predetermined time window and the second predetermined time window are of substantially equal duration and occur back-to-back.

It is an advantage of this embodiment that the contribution of the ambient light in the distance calculation formula can easily be cancelled out by carrying out a subtraction of the accumulated ambient light averaged from surrounding pixels.

In a specific embodiment, each of the plurality of picture elements comprises at least two charge storage wells, and the detecting of the first amount of light and said detecting of said second amount of light occurs at respective ones of said at least two charge storage wells.

The term "charge storage well" designates a storage provided in the semiconductor substrate, e.g. a capacitor, that stores electrical charges generated by the conversion of photons impinging on the pixel. The objective of this specific embodiment is to realize a better signal-to-noise ratio improving the overall range of the sensor.

According to an aspect of the present invention, there is provided a vehicle, comprising: a system as described above arranged to operatively cover at least a part of an area surrounding said vehicle.

The system according to the present invention is particularly advantageous in a vehicle with ADAS or autonomous driving control unit such as but not limited to ECU (electrical control unit). The vehicle may further comprise a vehicle control unit, adapted for receiving measurement information from the system and for using the information for ADAS control or autonomous driving decision taking. The part of an area surrounding the vehicle may include a road surface ahead of, beside, or behind the vehicle. Accordingly, the system may provide road profile information of the surface ahead of the car, to be used for active suspension or semi-active suspension.

According to an aspect of the present invention, there is provided a camera, the camera comprising a system as described above, whereby the system is adapted to add 3D information to the camera image based on information obtained from the system, making it possible to create a 3D image.

According to an aspect of the present invention, there is provided a method for determining a distance to an object, the method comprising: using a solid-state light source to project a pattern of discrete spots of laser light towards the object in a sequence of pulses; using a detector comprising a plurality of picture elements to detect light representing said pattern of discrete spots as reflected by the object in synchronization with said sequence of pulses; and calculating the distance to the object as a function of exposure values generated by said picture elements in response to said detected light; wherein the picture elements generate exposure values by accumulating, for each pulse of said sequence, a first amount of electrical charge representative of a first amount of light reflected by said object during a first predetermined time window and a second amount of electrical charge representative of a second amount of light reflected by said object during a second predetermined time window, said second predetermined time window occurring after said first predetermined time window In an embodiment of the method according to the present invention, the first predetermined time window and the second predetermined time window are of substantially equal duration and occur back-to-back.

In an embodiment of the method according to the present invention, each of the plurality of picture elements comprises at least two charge storage wells, and wherein the detecting of the first amount of light and the detecting of the second amount of light occurs at respective ones of the at least two charge storage wells.

In an embodiment of the method according to the present invention, the projecting, the detecting, and the calculating are repeated periodically.

According to an aspect of the present invention, there is provided a computer program product comprising code means configured to cause a processor to carry out the method described above.

The technical effects and advantages of embodiments of the camera, the vehicle, the method, and the computer program product, according to the present invention correspond, mutatis mutandis, to those of the corresponding embodiments of the system according to the present invention.

BRIEF DESCRIPTION OF THE DRAWINGS

These and other aspects and advantages of the present invention will now be described in more detail with reference to the accompanying drawings, in which.

DETAILED DESCRIPTION OF THE INVENTION

Figure 1:
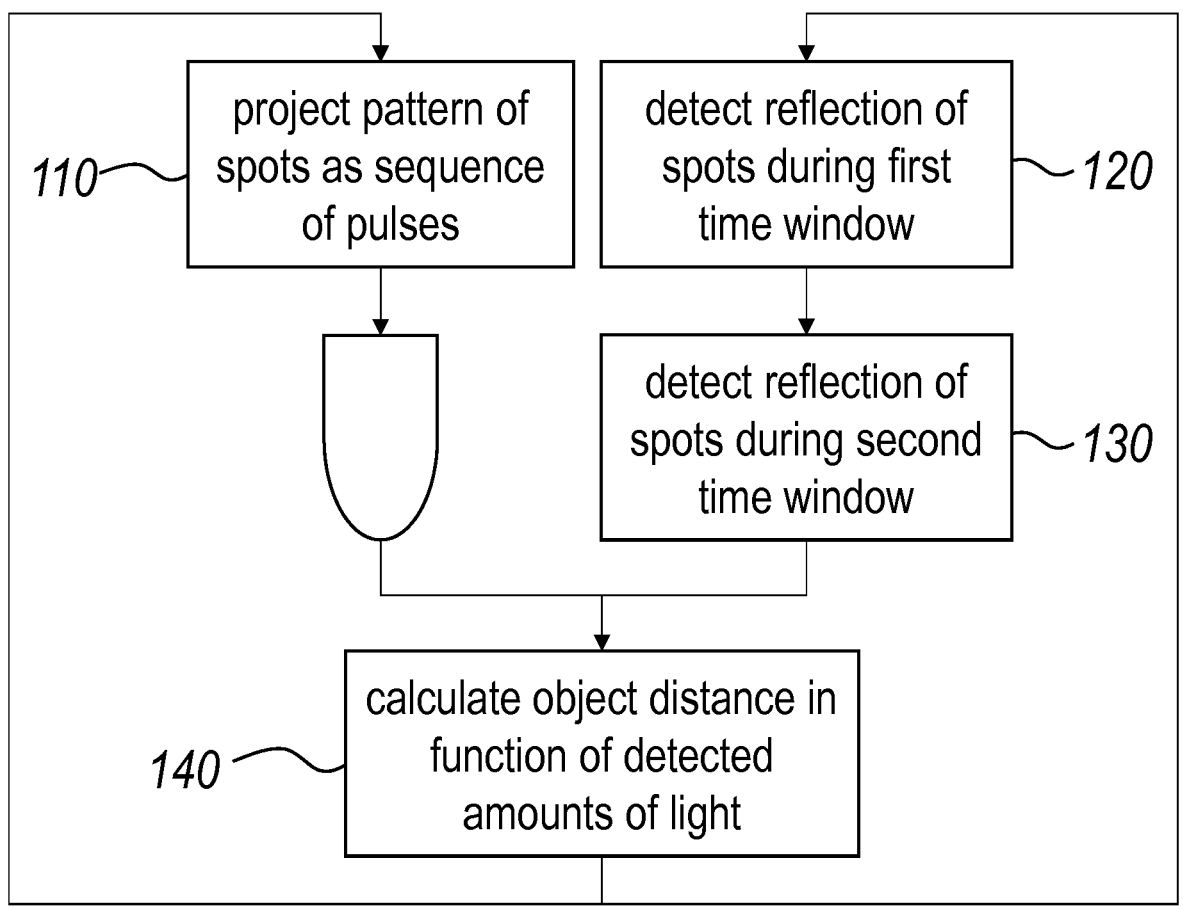
FIG. 1 represents a flow chart of an embodiment of the method according to the present invention.

The surround sensing systems of the type disclosed in international patent application publication WO 2015/004213 A1, in the name of the present applicant, has the advantage of observing an extensive scene while illuminating that scene simultaneously or partially simultaneously only in a number of discrete and well-defined spots, in particular a predefined spot pattern. By using VCSEL lasers with an outstanding bundle quality and a very narrow output spectrum, it is possible to obtain a detection range with a limited amount of output power, even in the presence of daylight. The actual ranging performed in the system of WO 2015/004213 A1 relies on displacement detection, in particular triangulation, which was understood to be the only method practically available in the context of the long (quasi-stationary) pulse durations that were necessary in view of the power budget. To date, it had not been possible to achieve the same power/performance characteristics with a compact, semiconductor based time-of-flight based system.

The present invention overcomes this limitation by radically changing the way the time-of-flight based system operates. The invention increases the total amount of light energy emitted for each time-of-flight measurement (and thus, the number of photons available for detection at the detector for each time-of-flight measurement) by increasing the duration of individual pulses and by producing a virtual "composite pulse", consisting of a sequence of a large number of individual pulses. This bundling of extended pulses allowed the inventors to obtain the required amount of light energy (photons) for the desired operational range with low-power VCSELs.

Where an individual pulse of pre-existing LIDAR systems may have a duration of 1 ns, the systems according to the present invention benefit from a substantially longer pulse duration to partially compensate for the relatively low power level of semiconductor lasers such as VCSELs; in embodiments of the present invention, individual pulses within a sequence may have an exemplary duration of 1 µs (this is one possible value, chosen here to keep the description clear and simple; more generally, in embodiments of the present invention, the pulse duration may for example be 500 ns or more, preferably 750 ns or more, most preferably 900 ns or more). In an exemplary system according to the present invention, a sequence may consist of 1000 pulse cycles, thus adding up to a duration of 1 ms. Given the fact that light would need approximately 0.66 µs to travel to a target at a distance of 100 m and back to the detector, it is possible to use composite pulses of this duration for ranging at distance of this order of magnitude; the skilled person will be able to adjust the required number of pulse cycles in function of the selected pulse width and the desired range. The detection of the sequence preferably comprises detecting the individual pulses in synchronization with the VCSEL-based light source, and accumulating the charges generated in response to the incoming photons at the pixel well level for the entire sequence prior to read-out. The term "exposure value" is used hereinafter to designate the value representative of the charge (and thus of the amount of light received at the pixel) integrated over the sequence. The sequence emission and detection may be repeated periodically.

The present invention operates by using range gating. Range gated imagers integrate the detected power of the reflection of the emitted pulse for the duration of the pulse. The amount of temporal overlap between the pulse emission window and the arrival of the reflected pulse depends on the return time of the light pulse, and thus on the distance travelled by the pulse. Thus, the integrated power is correlated to the distance travelled by the pulse. The present invention uses the principle of range gating, as applied to the sequences of pulses described hereinabove. In the following description, the integration of individual pulses of a sequence at the level of a picture element to obtain a measurement of the entire sequence is implicitly understood.

FIG. 1 represents a flow chart of an embodiment of the method according to the present invention. Without loss of generality, the ranging method is described with reference to a range gating algorithm. In a first time window 10, the method comprises projecting 110 a pattern of spots of laser light (e.g. a regular or an irregular spatial pattern of spots) from a light source comprising a solid-state light source 210 onto any objects in the targeted area of the scenery. The spatial pattern is repeatedly projected in a sequence of pulses.

As indicated above, the solid-state light source may comprise a VCSEL array or a laser with a grating adapted to produce the desired pattern. In order for the system to operate optimally, even at long ranges and with high levels of ambient light (e.g., in daylight), a VCSEL for use in embodiments of the present invention is preferably arranged to emit a maximum optical power per spot per unit of area. Thus, lasers with a good beam quality (low M2-factor) are preferred. More preferably, the lasers should have a minimal wavelength spread; a particularly low wavelength spread can be achieved with monomode lasers. Thus, substantially identical can reproducibly be generated, with the necessary spatial and temporal accuracy.

During the same time window in which a pulse is emitted, or in a substantially overlapping time window, a first amount of light representing the pattern of spots as reflected by the object of interest is detected 120 at a detector, which is preferably arranged as near as possible to the light source. The synchronicity or near synchronicity between the projection 110 of the spot pattern and the first detection 120 of its reflection, is illustrated in the flow chart by the side-by-side arrangement of these steps. In a subsequent second predetermined time window 20, a second amount of light representing the reflected light spot is detected 130 at the detector. During this second window 20, the solid-state light source is inactive. The distance to the object can then be calculated 140 as a function of the first amount of reflected light and the second amount of reflected light.

The first predetermined time window 10 and the second predetermined time window 20 are preferably back-to-back windows of substantially equal duration, to facilitate noise and ambient light cancellation by subtracting one of the detected amounts from the other one. An exemplary timing scheme will be described in more detail below in conjunction with FIG. 3.

The detector comprises a plurality of picture elements, i.e. it consists of a picture element array with adequate optics arranged to project an image of the scenery (including the illuminated spots) onto the picture element. The term "picture element" as used herein may refer to an individual light-sensitive area or well of a pixel, or to an entire pixel (which may comprise multiple wells, see below). For every given projected spot, the detecting 120 of the first amount of light and the detecting 130 of the second amount of light occurs at the same one or the same group of the plurality of picture elements.

Without loss of generality, each of the picture elements may be a pixel comprising at least two charge storage wells 221, 222, such that the detecting 120 of the first amount of light and the detecting 130 of the second amount of light can occur at the respective charge storage wells 221, 222 of the same pixel or pixel group.

Figure 2:
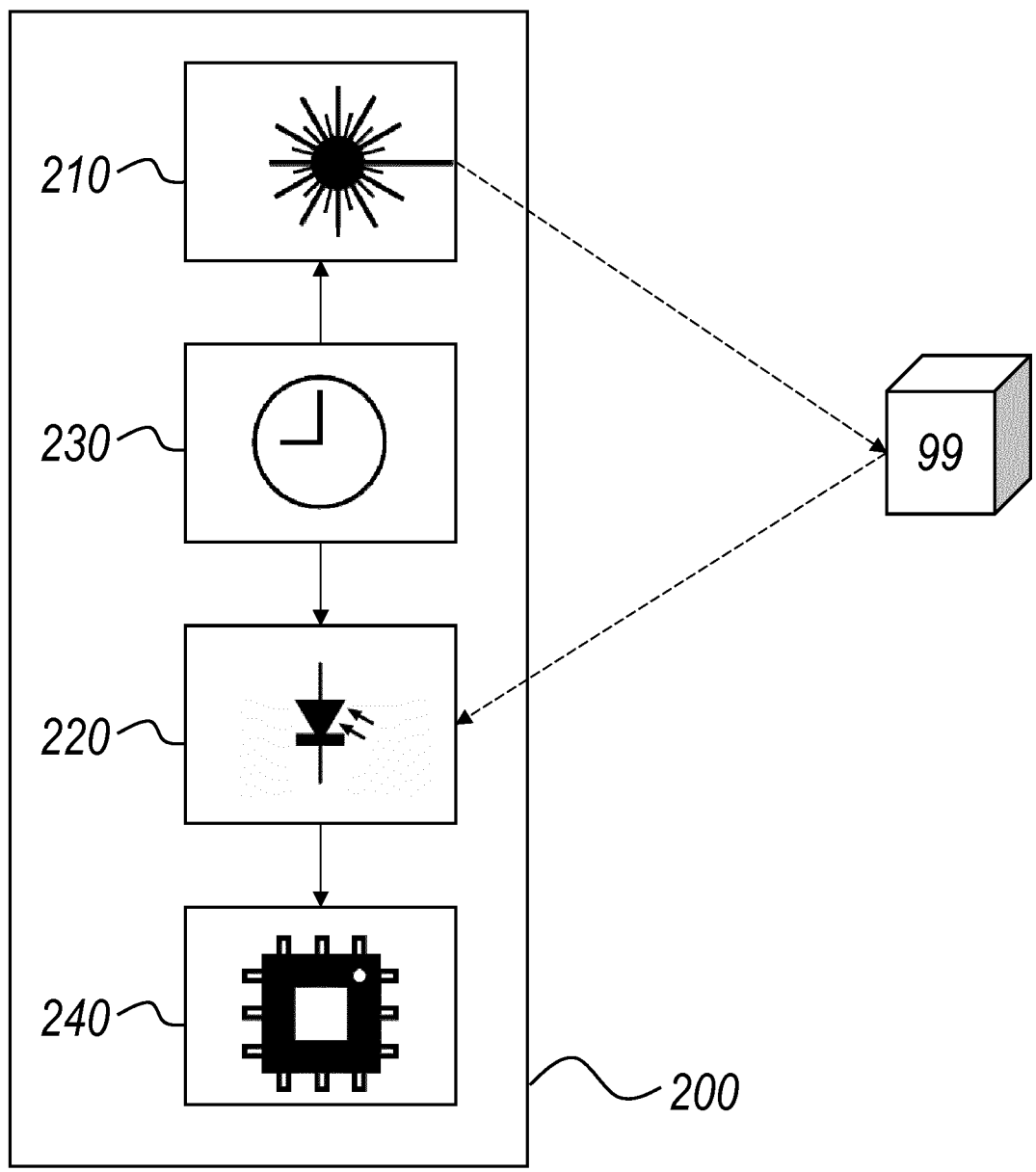
FIG. 2 schematically represents an embodiment of the system according to the present invention.

FIG. 2 schematically represents an embodiment of the system according to the present invention, in relation to an object 99 in the scenery of interest. The system 200 comprises a solid-state light source 210 for projecting a pattern of a sequence of spots, which may be repeated periodically, onto the object 99. A detector 220 is arranged near the light source and configured to detect light reflected by the object.

The light beam bouncing off the object 99 is illustrated as an arrow in dashed lines, travelling from the light source 210 to the object 99 and back to the detector 220. It should be noted that this representation is strictly schematic, and not intended to be indicative of any actual relative distances or angles.

A synchronization means 230, which may include a conventional clock circuit or oscillator, is configured to operate the solid-state light source 210 so as to project the pattern of spots onto the object during first predetermined time windows 10 and to operate the detector 220 so as to detect a first amount of light representing the light spot(s) reflected by the object 99 at substantially the same time. It further operates the detector 220 to detect a second amount of light representing the light spots reflected by the object 99, during respective subsequent second predetermined time windows 20. Appropriate processing means 240 are configured to calculate the distance to the object as a function of the first amount of reflected light and the second amount of reflected light.

FIG. 3 represents a timing diagram for light projection and detection in embodiments of the present invention. For clarity reasons, only a single pulse of the pulse sequence which is repeated periodically of FIG. 1 is illustrated, which consists of a first time window 10 and a second time window 20.

Figure 3A:
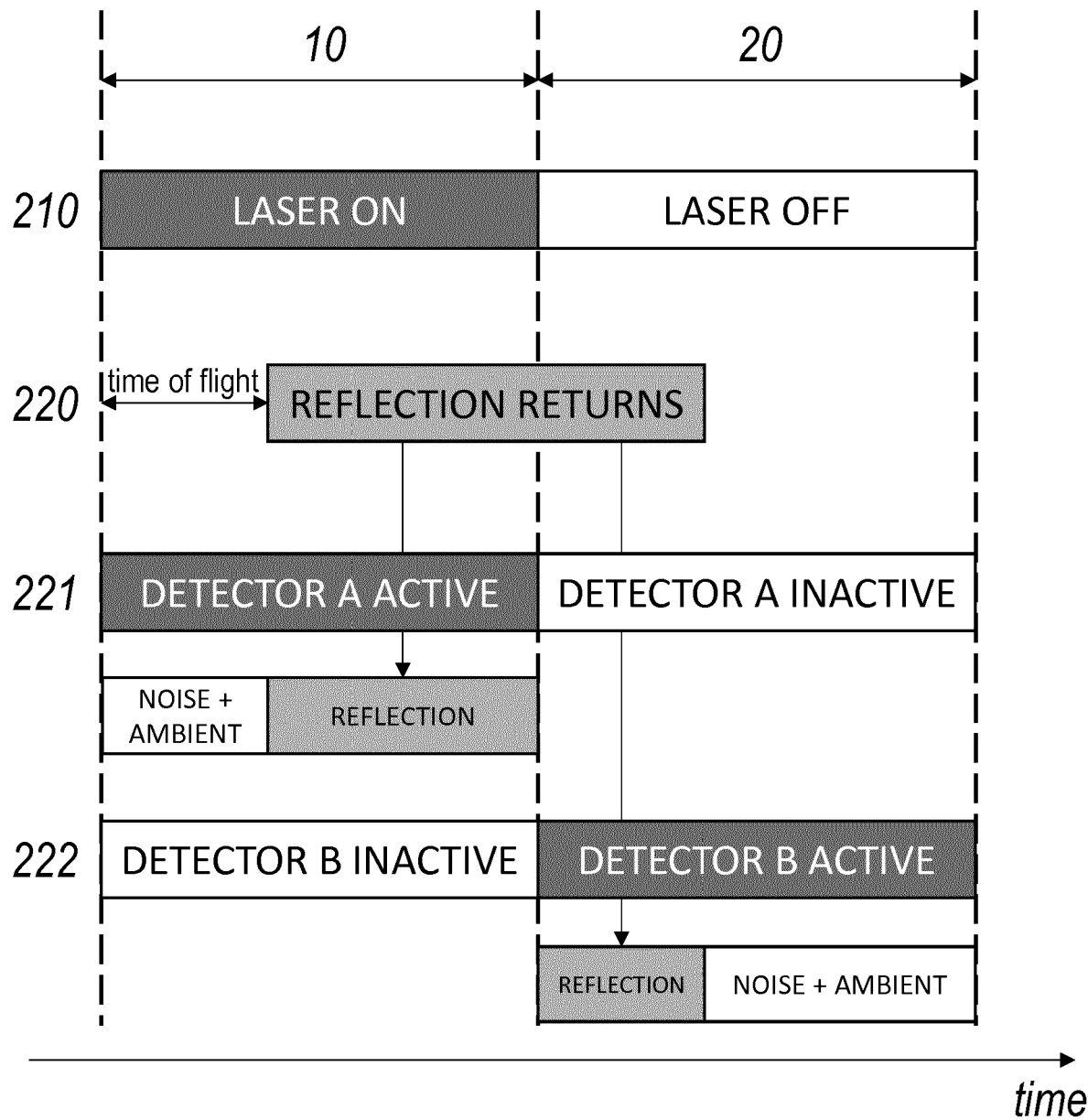
FIG. 3 represents a timing diagram for light projection and detection in embodiments of the present invention.

As can be seen in FIG. 3a, during the first time window 10, the solid-state light source 210 is in its "ON" state, emitting the pattern of light spots onto the scenery. During the second time window 20, the solid-state light source 210 is in its "OFF" state.

The arrival of the reflected light at the detector 220 is delayed relative to the start of the projection by an amount of time that is proportional to the distance travelled (approximately 3.3 ns/m in free space). Due to this delay, only a part of the reflected light will be detected at the first well 221 of the detector 220, which is only activated during the first time window 10. Thus, the charge accumulated in this first well during its period of activation (the first time window 10) consists of a part representing only the noise and the ambient light impinging on the pixel prior to the arrival of the reflected pulse, and a part representing the noise, the ambient light, and the leading edge of the reflected pulse.

The latter part of the reflected pulse will be detected at the second well 222 of the detector 220, which is only activated during the second time window 20, which preferably immediately follows the first time window 10. Thus, the charge accumulated in this second well during its period of activation (the second time window 20) consists of a part representing the noise, the ambient light, and the trailing edge of the reflected pulse, and a part representing only the noise and the ambient light impinging on the pixel after the arrival of the reflected pulse.

The greater the distance between the reflecting object 99 and the system 200, the smaller the proportion of the pulse that will be detected in the first well 221 and the larger the proportion of the pulse that will be detected in the second well 222.

If the leading edge of the reflected pulse arrives after the closing of the first well 221 (i.e., after the end of the first time window 10), the proportion of the reflected pulse that can be detected in the second well 222 will decrease again with increasing time of flight delay.

Figure 3B:
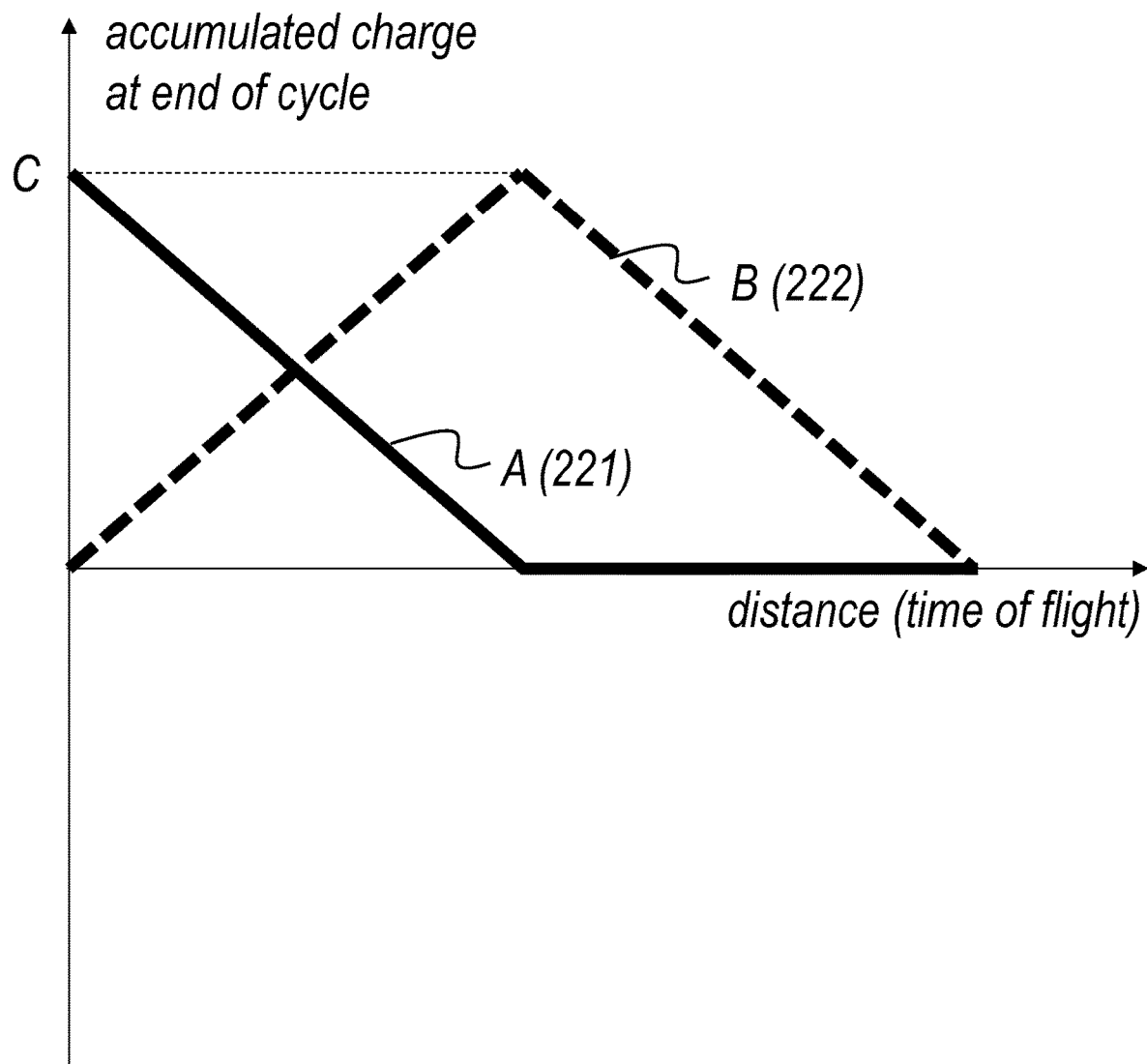

The resulting amounts of charge A, B in each of the respective wells 221, 222 for varying distances of the object 99 is shown in FIG. 3b. To simplify the representation, the effect of the attenuation of light with distance, according to the inverse square law, has not been taken into account in the diagram. It is clear that for time of flight delays up to the combined duration of the first time window 10 and the second time window 20, the time of flight delay can in principle unambiguously be derived from the values of A and B:

For time of flight delays up to the duration of the first time window 10, B is proportional to the distance of the object 99. To easily arrive at a determination of the absolute distance, the normalized value B/(B+A) may be used, removing any impact of non-perfect reflectivity of the detected object and of the inverse square law.

For time of flight delays exceeding the duration of the first time window 10, A consists of daylight and noise contributions only (not illustrated), and C−B is substantially proportional (after correcting for the inverse square law) to the distance of the object 99, where C is an offset value.

Figure 3C:
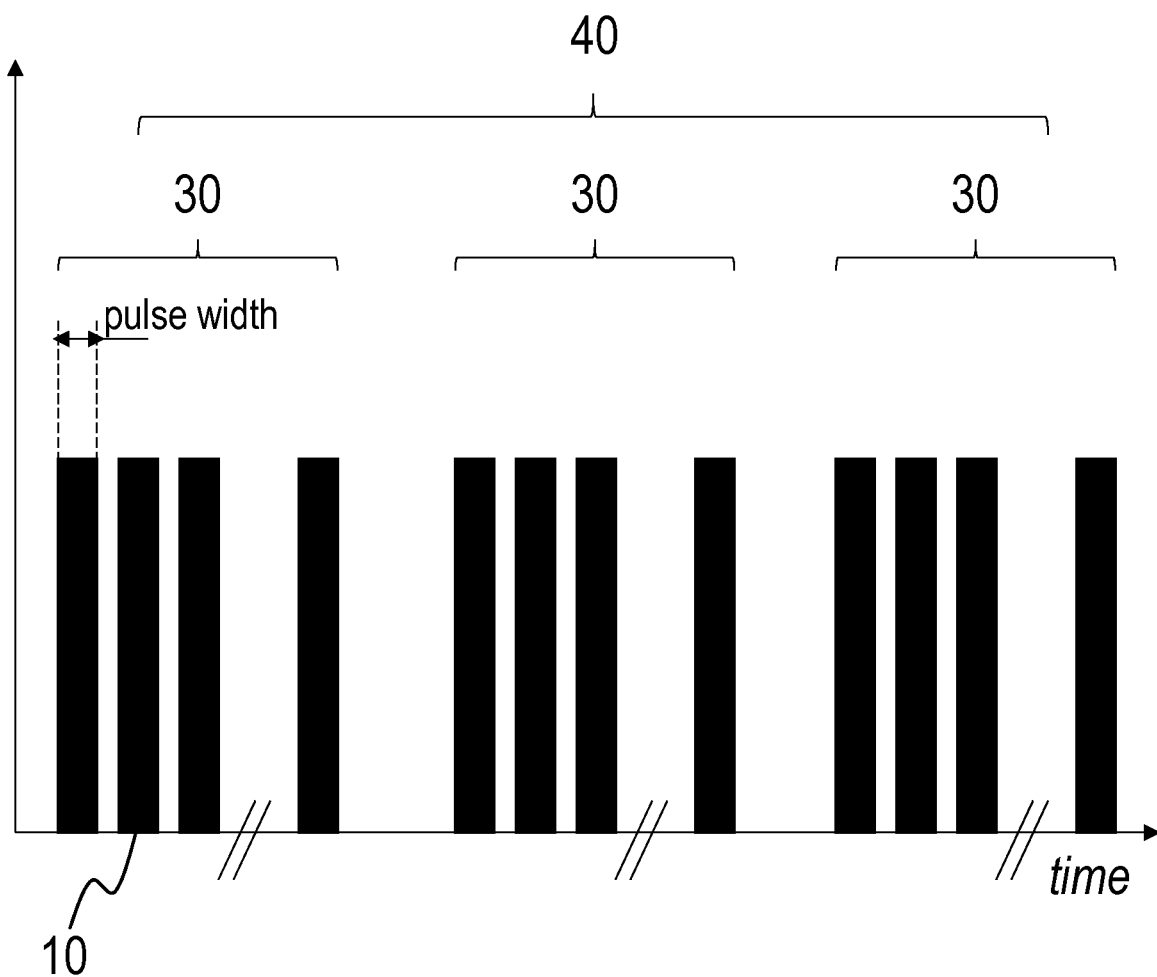

While FIGS. 3a and 3b illustrate the principle of the invention in relation to a single pulse emitted in the time window 10, it shall be understood that the illustrated pulse is part of a sequence of pulses as defined above. FIG. 3c schematically illustrates exemplary timing characteristics of such a sequence. As illustrated, the illumination scheme 40 consists of a repeated emission of a sequence 30 of individual pulses 10. The width of the individual pulses 10 is determined by the maximal operating range. The entire sequence may be repeated at a frequency of, for example, 60 Hz.

The ranging system according to the present invention may be integrated with a triangulation-based system in accordance with WO 2015/004213 A1. If miniaturization is aimed for, the triangulation-based system will end up having a relatively small distance between its projector and its detector, thus leaving it with a reduced operating range. However, it is precisely at short range that the combination presents its benefit, because the triangulation-based system can cover the distances at which the time-of-flight based system cannot operate sufficiently accurately.

The entire ranging process may be repeated iteratively, so as to monitor the distance to the detected object or objects over time. Thus, the result of this method can be used in processes that require information about the distance to detected objects on a continuous basis, such as advanced driver assistance systems, vehicles with an active suspension, or autonomous vehicles.

In order for all elements of the system as described to operate optimally, the system has to be thermally stable. Thermal stability avoids, among other things, undesired wavelength shifts of the optical elements (thermal drift), which would otherwise impair the proper functioning of the optical filters and other elements of the optical chain. Embodiments of the system according to the present invention achieves thermal stability by their design, or by active regulation by means of a temperature control loop with a PID-type controller.

WO 2015/004213 A1 discloses various techniques to minimize the amount of ambient light that reaches the pixels during the detection intervals, thus improving the accuracy of the detection of the patterned laser spots. While these techniques have not been disclosed in the context of a LIDAR system, the inventors of the present invention have found that several such techniques yield excellent results when combined with embodiments of the present invention. This is particularly true for the use of narrow bandpass filters at the detector, and the use of adequate optical arrangements to ensure nearly perpendicular incidence of the reflected light onto the filters. The details of these arrangements as they appear in WO 2015/004213 A1 are hereby incorporated by reference. Further features and details are provided hereinafter.

While various techniques known from WO 2015/004213 A1 may be applied to embodiments of the present invention to minimize the amount of ambient light that reaches the pixels during the detection intervals, a certain amount of ambient light cannot be avoided. In a multi-pixel system, only some of the pixels will be illuminated by reflected spots, while others will be illuminated by residual ambient light only. The signal levels of the latter group of pixels can be used to estimate the contribution of the ambient light to the signals in the pixels of interest, and to subtract that contribution accordingly. Additionally or alternatively, background light or ambient light may be subtracted from the detected signal at pixel level. This requires two exposures, one during the arrival of the laser pulse and one in the absence of a pulse.

Figure 4:
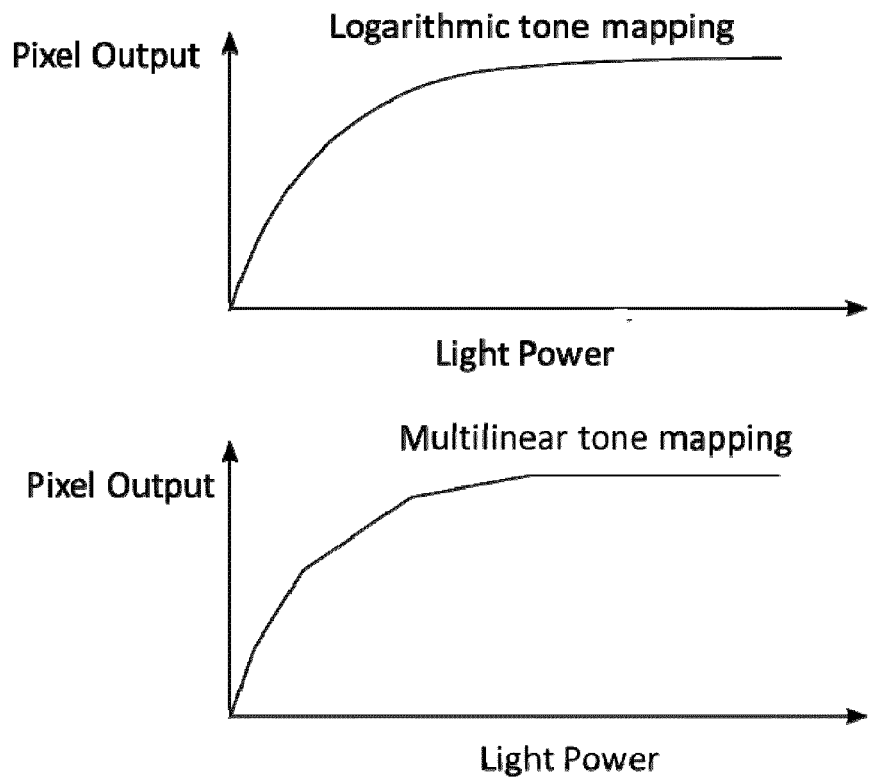
FIG. 4 provides diagrams of exemplary pixel output in function of incident light power as obtained by logarithmic tone mapping (top) and multilinear tone mapping (bottom)
Figure 5:
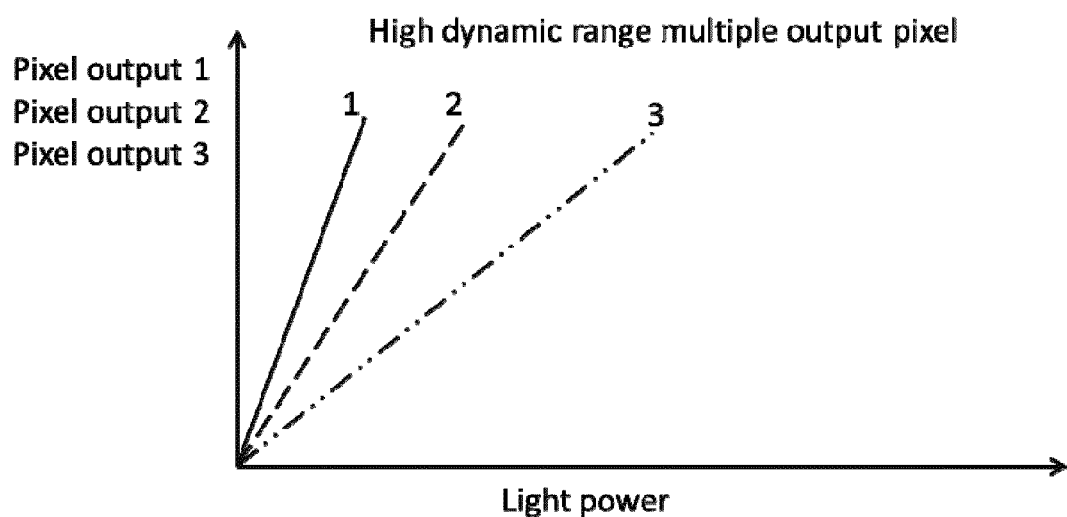
FIG. 5 provides a diagram of exemplary pixel outputs in function of incident light power as obtained by a high dynamic range multiple output pixel.

In some embodiments, the detector may be a high dynamic range detector, i.e. a detector having a dynamic range of at least 90 dB, preferably at least 120 dB. The presence of a high dynamic range sensor, i.e. a sensor capable of acquiring a large amount of photons without saturation while maintaining sufficient discrimination of intensity levels in the darkest part of the scene, is an advantage of the use of such a sensor; it allows for a sensor that has a very long range and yet remains capable of detection objects at short distance (where the reflected light is relatively intense) without undergoing saturation. The inventors have found that the use of a true high dynamic range sensor is more advantageous than the use of a sensor that applies tone mapping. In tone mapping, the sensor linear range is compressed towards the higher resolution. In literature, several compression methods are documented, such as logarithmic compression or multilinear compression (see FIG. 4). However this non-linear compression necessitates relinearisation of the signals before performing logical or arithmetic operations on the captured scene to extract the relief information. The solution according to the invention therefore increases detection accuracy without increasing the computational requirements. It is a further advantage of some embodiments to use a fully linear high dynamic range sensor as presented in FIG. 5. A pixel architecture and an optical detector that are capable of providing the desired dynamic range characteristics are disclosed in US patent application publication no. US 2014/353472 A1, in particular paragraphs 65-73 and 88, the content of which is incorporated by reference for the purpose of allowing the skilled person to practice this aspect of the present invention.

Figure 6:
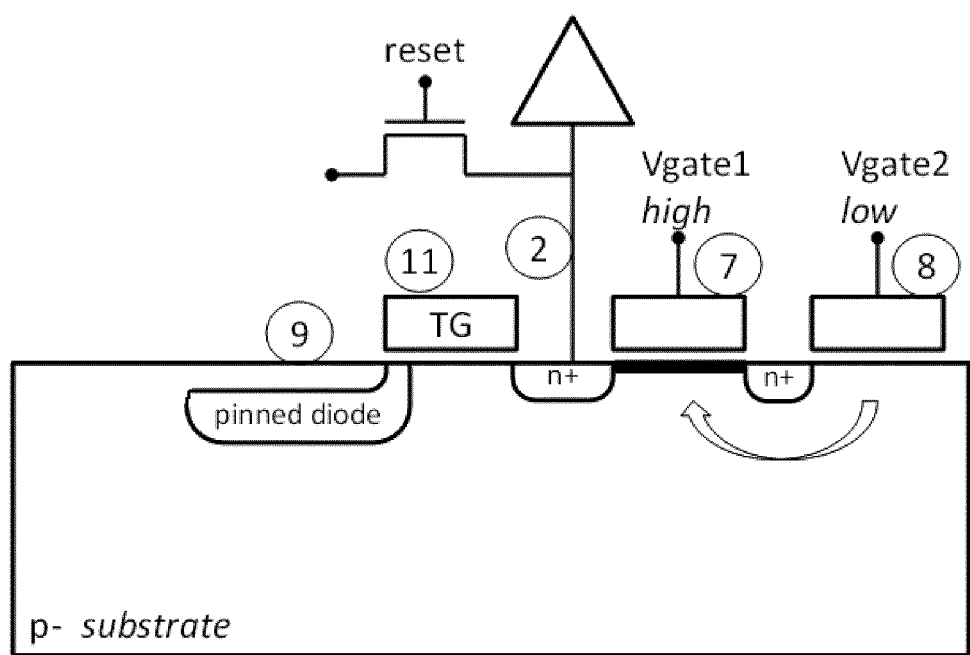
FIG. 6 schematically illustrates the structure of a high-dynamic range pixel for use in embodiments of the present invention.

Embodiments of the present invention use a high dynamic range pixel. This can be obtained by a sizeable full-well capacity of the charge reservoir or by designs limiting the electronic noise per pixel or by usage of CCD gates that do not add noise at charge transfer, or through a design with a large detection quantum efficiency (DQE) (e.g., in the range of 50% for front illumination or 90% in case of back illumination, also known as back thinning), or by a special design such as shown in FIG. 6 (see below), or by any combination of the listed improvements. Furthermore, the dynamic range can be further enlarged by adding an overflow capacity to the pixel in overlay at its front side (this implementation requires back thinning). Preferably, the pixel design implements an anti-blooming mechanism.

FIG. 6 presents a schematic illustration of an advantageous implementation of a pixel with high dynamic range. The example in this figure makes use of two storage gates 7, 8, connected to the floating diffusion. After exposure, the electron generated by the scene AND the laser pulse, is transferred on the floating diffusion using the transfer gate 11. Both Vgate1 and Vgate2 gate voltages are set high. The charges are then spread over both capacitors, realizing a significant Full Well. Once this high full-well data is read via connection to the amplifier, the voltage Vgate2 is set low. The electrons reflow towards capacitor 7, increasing the total pixel gain. The data can be read through the amplifier. It is further possible to achieve an even higher gain by applying later a low voltage on Vgate1. The electrons reflow towards the floating diffusion 2.

Figure 7:
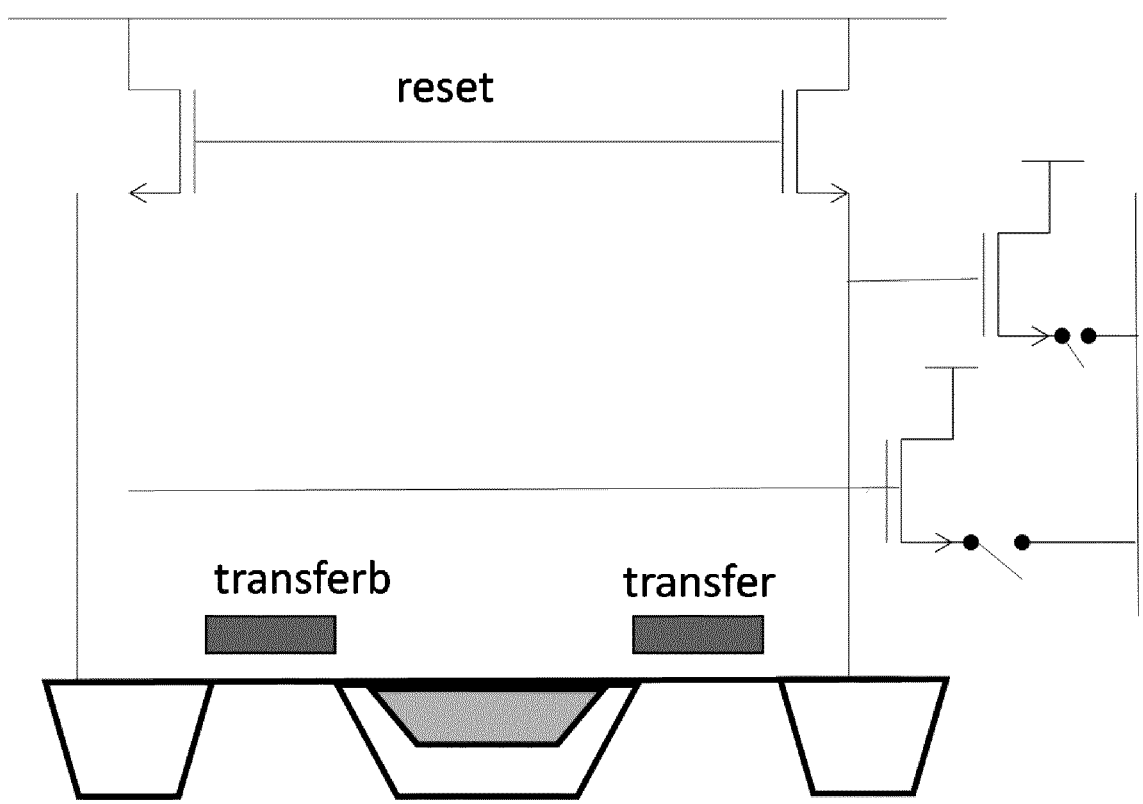
FIG. 7 schematically illustrates an embodiment of a pixel architecture with two charge wells (bins) with each a separate transfer gate for use in embodiments of the present invention.

FIG. 7 represents a possible dual-well or dual-bin implementation of an envisaged pixel to be used in CMOS technology. The impinging signal is distributed over two charge storages. Each reservoir has a separate transfer gate controlled by an external pulse which is synchronized with the pulse of the laser sources.

Figure 8:
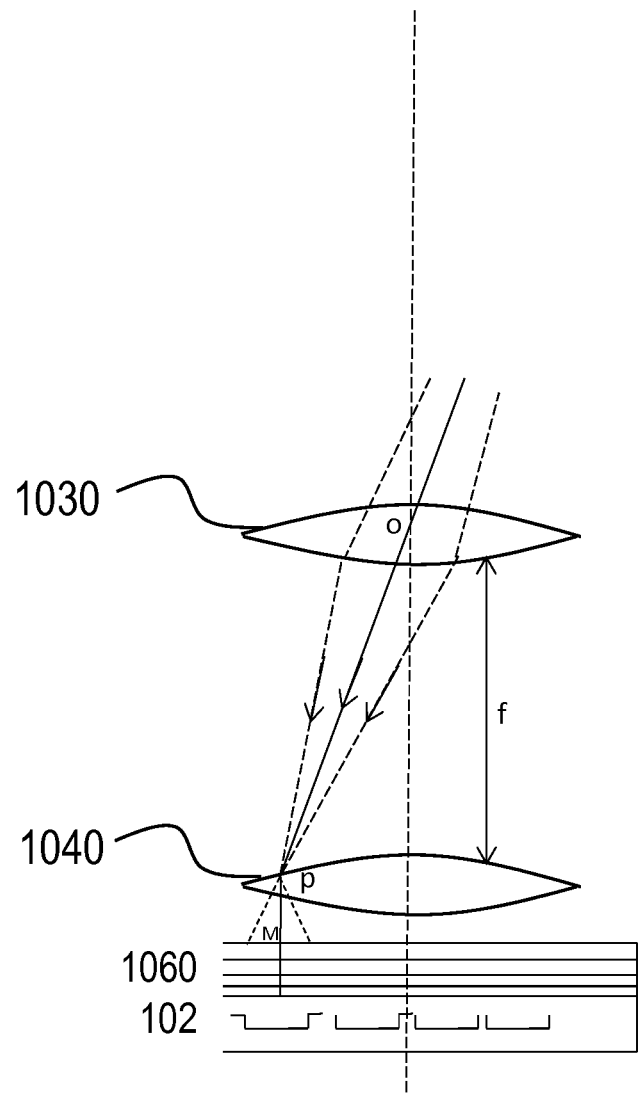
FIG. 8 schematically illustrates a first exemplary optical arrangement for use in embodiments of the present invention.
Figure 9:
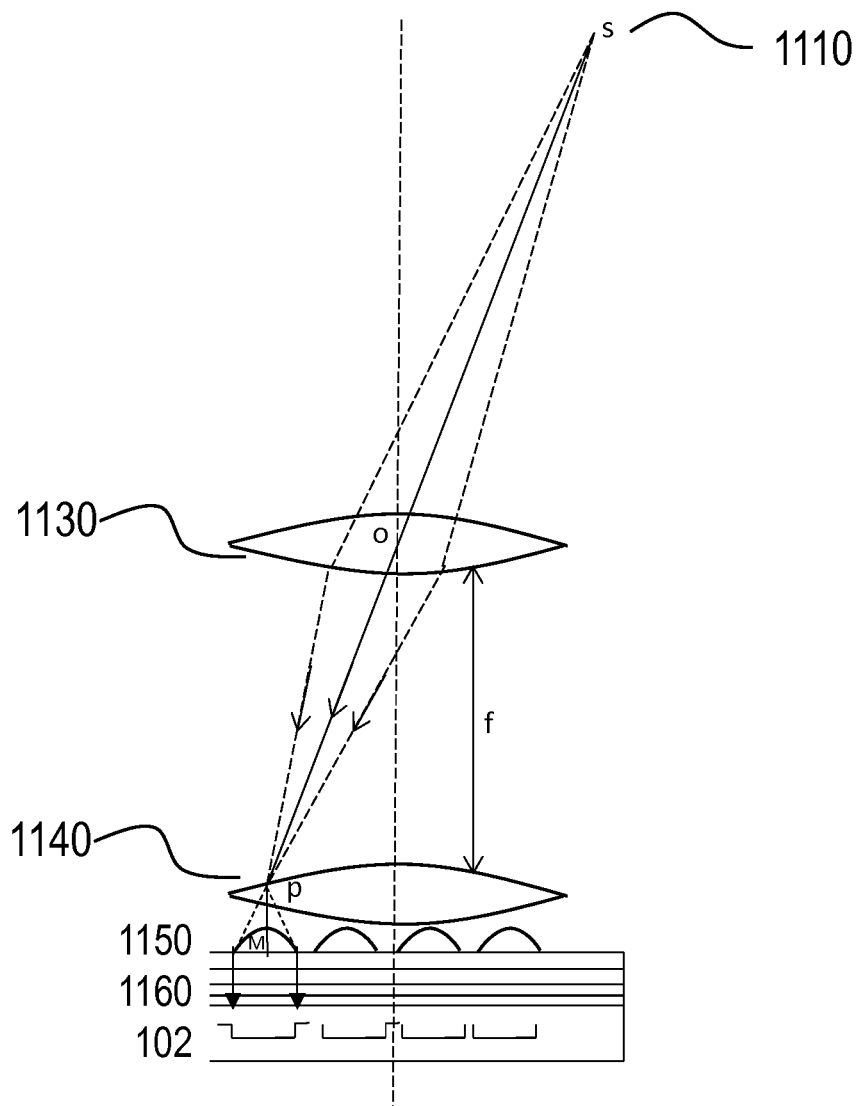
FIG. 9 schematically illustrates a second exemplary optical arrangement for use in embodiments of the present invention.
Figure 10:
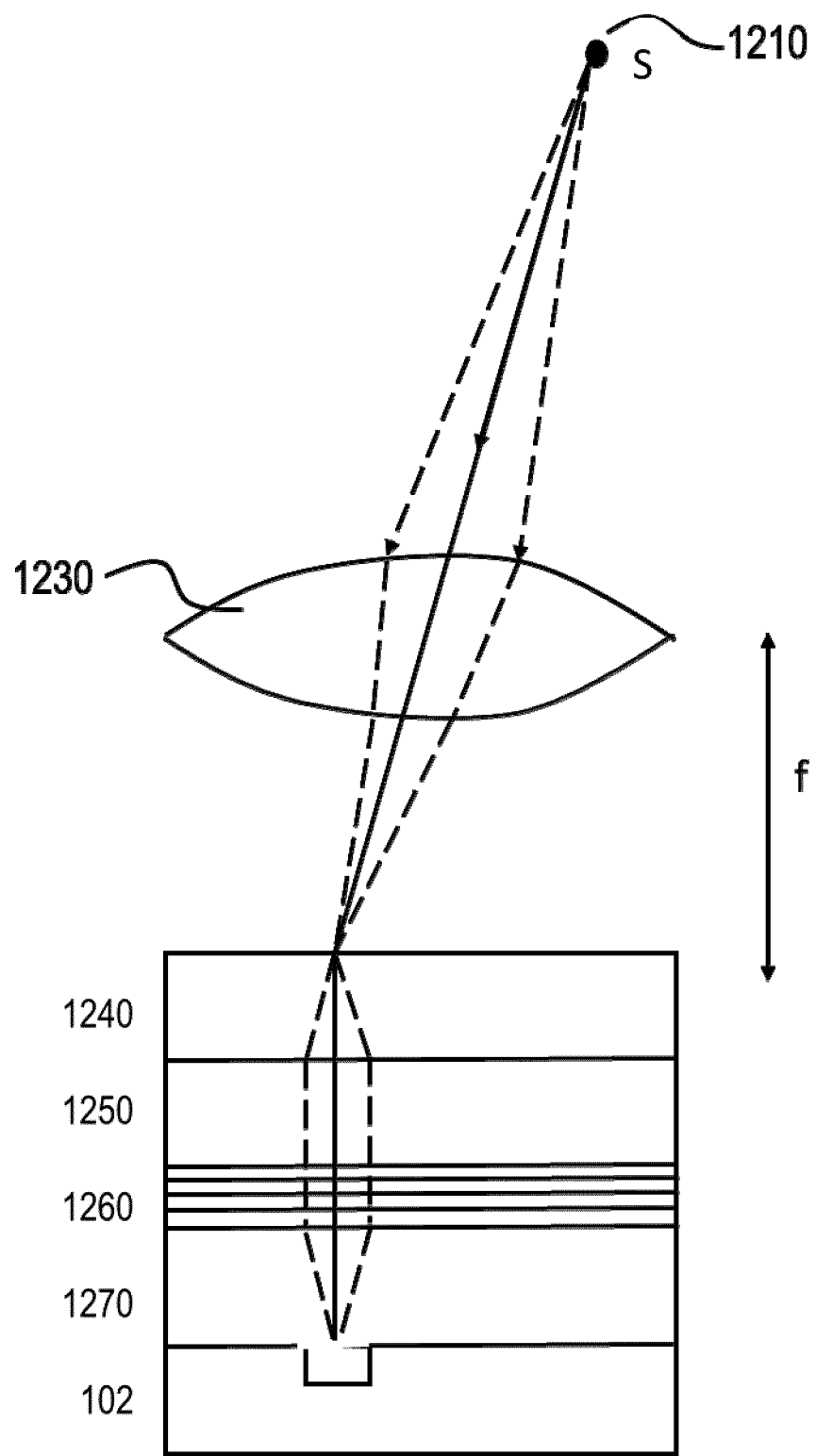
FIG. 10 schematically illustrates a third exemplary optical arrangement for use in embodiments of the present invention.

FIGS. 8-10 illustrate cameras that may be used in embodiments of the invention, where the light radiation source emits monochromatic light and the at least one detector is equipped with a corresponding narrow bandpass filter and optics arranged so as to modify an angle of incidence onto said narrow bandpass filter, to confine said angle of incidence to a predetermined range around a normal of a main surface of said narrow bandpass filter, said optics comprising an image-space telecentric lens. The term "camera" is used herein as a combination of a sensor and associated optics (lenses, lens arrays, filter). In particular, in FIG. 9, the optics further comprise a minilens array arranged between the image-space telecentric lens and the at least one detector, such that individual minilenses of the minilens array focus incident light on respective light-sensitive areas of individual pixels of the at least one detector. It is an advantage of this one-minilens-per-pixel arrangement that the loss due to the fill factor of the underlying sensor can be reduced, by optically guiding all incident light to the light-sensitive portion of the pixels.

These examples all result in radiation travelling a substantially equal length through the filter medium or in other words in that the incident radiation is substantially orthogonal to the filter surface, i.e. it is confined to an angle of incidence within a predetermined range around the normal of the filter surface, thus allowing in accurate filtering within a narrow bandwidth to e.g. filter the daylight, the sunlight and in order to for the spots to surpass the daylight.

The correction of the angle of incidence is of particular importance in embodiments of the present invention where the entire space around a vehicle is to be monitored with a limited number of sensors, for instance 8 sensors, such that the incident rays may extend over a solid angle of for example 1×1 rad. FIG. 8 schematically illustrates a first optical arrangement of this type. It comprises a first lens 1030 and a second lens 1040, with approximately the same focal length f, in an image space telecentric configuration. That means that all chief rays (rays passing through the center of the aperture stop) are normal to the image plane. An exemplary numerical aperture of 0.16 corresponds to a cone angle of 9.3° (half cone angle). The maximum incidence angle on the narrow bandpass filter 1060, arranged between the lens system 1030-1040 and the sensor 102, would thus be 9.3°.

As illustrated in FIG. 9, the preferred design consists of a tandem of two lenses 1130, 1140 with approximately the same focal length f, in an image-space telecentric configuration (the configuration is optionally also object-space telecentric), a planar stack of mini-lens array 1150, a spectral filter 1160 and a CMOS detector 102. Since the center O of the first lens 1130 is in the focus of the second lens 1140, every ray that crosses O will be refracted by the second lens 1140 in a direction parallel to the optical axis. Consider now a particular laser spot S 1110 located at a very large distance as compared to the focal length of the first lens 1130. Thus the image of this spot 1110 by the first lens 1130 is a point P located close to the focal plane of this lens, thus exactly in the middle plane of the second lens 1140. The light rays that are emitted from the spot S 1110 and captured by the first lens 1130 form a light cone that converges towards the point P in the second lens 1140. The central axis of this light cone crosses the point O and is refracted parallel the optical axis and thus perpendicular to the spectral filter 1160 so as to achieve optimal spectral sensitivity. Hence, the second lens 1140 acts as a correcting lens for the angle of the incident light beam. The other rays of the cone can also be bent in a bundle of rays parallel to the optical axis by using a small convex mini-lens 1150 behind the second lens 1140 in such a way that the point P is located in the focal point of the mini-lens 1150. In this way all the imaging rays of the spot S 1110 are bent in a direction nearly perpendicular to the spectral filter. This can now be done in front of every pixel of the CMOS detector separately by using an array of mini-lenses positioned in front of every pixel. In this configuration, the minilenses have an image-telecentric function. The main advantage is that the pupil of the first lens 1030 can be enlarged, or the aperture can be eliminated while compensating for the increase in spherical aberration by a local correction optics in the mini-lens 1150. In this way the sensitivity of the sensor assembly can be improved. A second mini-lens array (not shown in FIG. 11) may be added between the spectral filter 1160 and the CMOS pixels 102, to focus the parallel rays back to the photodiodes of the pixels so as to maximize the fill factor.

For the first and second lenses 1130, 1140, commercially available lenses may be used. The skilled person will appreciate that lenses typically used in other smart phone cameras or webcams of comparable quality can also be used. The aforementioned iSight camera has a 6×3 mm CMOS sensor with 8 megapixels, 1.5 µm pixel size, a very large aperture of f/2.2, an objective focal length of about f=7 mm, and a pupil diameter about 3.2 mm. The viewing angle is of the order of 1 rad×1 rad. If we assume that the resolution of the camera is roughly the pixel size (1.5 micron), we can conclude (from Abbe's law) that the aberrations of the lens are corrected for all the rays of the viewing angle selected by the aperture.

Figure 11:
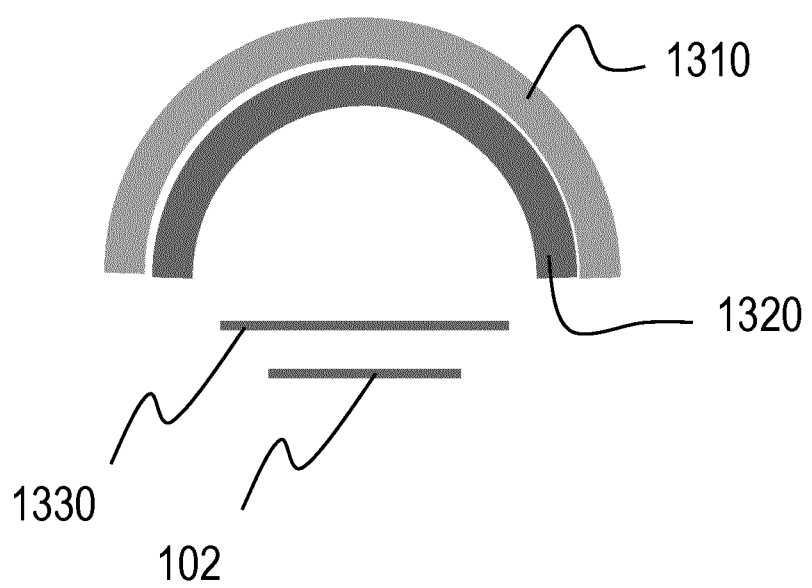
FIG. 11 schematically illustrates a fourth exemplary optical arrangement.

FIG. 10 illustrates a variation of the arrangement of FIG. 11, optimized for manufacturing in a single lithographic process. The first lens 1230 is similar to the first lens 1130 of the previous embodiment, but the angle-correcting second lens 1140 is replaced by a Fresnel lens 1240 with the same focal length f and the mini-lens arrays 1150 by Fresnel lens arrays 1250. The advantage is that they are completely flat and can be produced by nano-electronics technology (with discrete phase zones). A second mini-lens array 1270 may be added between the spectral filter 1260 and the CMOS pixels 102, to focus the parallel rays back to the photodiodes of the pixels so as to maximize the fill factor. Thus the camera is essentially a standard camera as the iSight but in which the CMOS sensor is replaced by a specially designed multilayer sensor in which all the components are produced in one integrated block within the same lithographic process. This multilayer sensor is cheap in mass production, compact, robust and it need not be aligned. Each of these five layers 1240, 1250, 1260, 1270, 102 has its own function to meet the requirements imposed by the present invention.

As the minimal angle of a cone generated by a lens of diameter d is of the order of $\lambda/d$, with $\lambda$ the wavelength of the light, the minimal cone angle is $\frac{1}{10}$ radian for a mini-lens diameter d=8.5 µm and $\lambda$=850 nm. With a good quality spectral interference filter this corresponds to a spectral window of about 3 nm.

FIG. 11 illustrates an alternative optical arrangement, comprising a dome 1310 (e.g., a bent glass plate) with the narrow bandpass filter 1320 disposed on its inside (as illustrated) or outside (not illustrated). The advantage of disposing the filter 1320 on the inside of the dome 1310, is that the dome 1310 protects the filter 1320 from outside forces. The dome 1310 and the filter 1320 optically cooperate to ensure that incident light passes through the filter 1320 along a direction that is substantially normal to the dome's surface. Fish-eye optics 1330 are provided between the dome-filter assembly and the sensor 102, which may be a CMOS or a CCD sensor or SPAD array. The fish-eye optics 1330 are arranged to guide the light that has passed through the dome-filter assembly towards the sensitive area of the sensor.

Optionally, further fish-eye optics are provided at the projector. In a specific embodiment, a plurality of VCSELs are mounted in a 1×n or a m×n configuration, whereby an exit angle of the laser beam can be realized over a spatial angle of m×1 rad in height and n×1 rad in width.

In some embodiments of the present invention, the intensity of the spots can be kept substantially constant over the full depth range, by applying a stepped or variable attenuation filter at the detector. Alternatively or in addition, also a non-symmetrical lens pupil can be provided for weakening the intensity of spots closer to the detector, while the intensity of the spots further away from the detector are received at full intensity. In this way clipping of the detector is avoided and the average intensity can be made substantially the same for all spots.

In some embodiments, the radiation source can be a VCSEL that can be split in different zones, whereby the laser ON time is controlled for the different zones. The images of the spots can thus be controlled to have a constant intensity, e.g. $\frac{2}{3}^{rd}$ of the A/D range. Alternatively the driving voltage can be driven over the array of spots as function of the height, again to obtain a constant intensity. Such controlling can be referred to as a saturation avoidance servoing loop. The different VCSELs within the array can be controlled individually for intensity, varying the intensity of the individual VCSELs in the pattern while projected simultaneously.

In some other embodiments of the present invention, a micro prism matrix can be used in front of the narrow bandwidth filter, such that the radiation is incident within an angle of incidence between +9° and −9° on the filter. This allows to obtain narrow bandwidth filtering. The prism matrix can for example be made by plastic moulding.

In embodiments of the present invention, e.g. where active suspension vehicle applications are envisaged, the projection of the spot pattern is advantageously directed downwards, i.e. towards the road.

A system according to the invention may include an implementation of steps of the methods described above in dedicated hardware (e.g., ASIC), configurable hardware (e.g., FPGA), programmable components (e.g., a DSP or general purpose processor with appropriate software), or any combination thereof. The same component(s) may also include other functions. The present invention also pertains to a computer program product comprising code means implementing the steps of the methods described above, which product may be provided on a computer-readable medium such as an optical, magnetic, or solid-state carrier.

The present invention also pertains to a vehicle comprising the system described above.

Embodiments of the present invention may be used advantageously in a wide variety of applications, including without limitation automotive applications, industrial applications, gaming applications, and the like, and this both indoor and outdoor, at short or long range. In some applications, different sensors according to embodiments of the present invention may be combined (e.g., daisy-chained) to produce panoramic coverage, preferably over a full circle (360° field of view).

While the invention has been described hereinabove with reference to separate system and method embodiments, this was done for clarifying purposes only. The skilled person will appreciate that features described in connection with the system or the method alone, can also be applied to the method or the system, respectively, with the same technical effects and advantages. Furthermore, the scope of the invention is not limited to these embodiments, but is defined by the accompanying claims.

The invention claimed is:

1. A system for determining a distance to an object comprising:
   a solid-state light source arranged for projecting a pattern of discrete spots of laser light towards said object in a periodically repeated sequence of pulses;
   a detector comprising a plurality of picture elements, said detector being configured for detecting light representing said pattern of discrete spots as reflected by said object in synchronization with said sequence of pulses; and
   processing means configured to calculate said distance to said object as a function of exposure values generated by said picture elements in response to said detected light;
   wherein said picture elements are provided in CMOS technology;
   wherein each of said picture elements comprises at least two charge wells with each a separate transfer gate, and an anti-blooming mechanism;
   wherein said picture elements are configured to generate said exposure values by accumulating, for all of the pulses of said sequence, a first amount of electrical charge representative of any or all of a first amount of light reflected by said object, ambient light, and noise during a first predetermined time window and a second electrical charge representative of any or all of a second amount of light reflected by said object, the ambient light, and the noise during a second predetermined time window, said second predetermined time window occurring immediately after said first predetermined time window,
   wherein said solid-state light source is in its "ON" state during the first predetermined time window and in its "OFF" state during said second predetermined time window,
   wherein said first predetermined time window and said second predetermined time window are of substantially equal duration and occur back-to-back,
   wherein said detecting of said first amount of light and said detecting of said second amount of light occurs at respective ones of said at least two charge storage wells,
   wherein if said object is present at a distance corresponding to a round-trip time-of-flight delay exceeding the duration of said first predetermined time window, the storage well accumulating said first amount of electrical charge accumulates the ambient light and the noise contributions only, wherein the processing means is configured to calculate said distance to said object at least based on the first amount of electrical charge and the second amount of electrical charge accumulated only during the first predetermined time window and the second predetermined time window.

2. A vehicle comprising a system according to claim 1 arranged to operatively cover at least a part of an area surrounding said vehicle, wherein said at least part of the area surrounding said vehicle includes a road surface ahead of, beside, or behind said vehicle, and
   wherein said vehicle further comprises a vehicle control unit configured to receive measurement information from said system and for using said information for autonomous driving assistance system (ADAS) applications or autonomous driving decision taking.

3. A camera, the camera comprising a system according to claim 1, wherein the system is adapted to add 3D information to the camera image based on information obtained from the system, making it possible to create a 3D image.

4. A camera, the camera comprising a system according to claim 2, wherein the system is adapted to add 3D information to the camera image based on information obtained from the system, making it possible to create a 3D image.

5. A method for determining a distance to an object, the method comprising:
   using a solid-state light source to project a pattern of discrete spots of laser light towards said object in a periodically repeated sequence of pulses;

using a detector comprising a plurality of picture elements to detect light representing said pattern of discrete spots as reflected by said object in synchronization with said sequence of pulses; and calculating said distance to said object as a function of exposure values generated by said picture elements in response to said detected light;

wherein said picture elements are provided in CMOS technology;

wherein each of said picture elements comprises at least two charge wells with each a separate transfer gate, and an anti-blooming mechanism;

wherein said picture elements generate said exposure values by accumulating, for all of the pulses of said sequence, any or all of a first amount of electrical charge representative of a first amount of light reflected by said object, ambient light, and noise during a first predetermined time window and a second amount of electrical charge representative of a second amount of light reflected by said object, the ambient light, and the noise during a second predetermined time window, said second predetermined time window occurring immediately after said first predetermined time window;

wherein said solid-state light source is in its "ON" state during the first predetermined time window and in its "OFF" state during said second predetermined time window;

wherein said first predetermined time window and said second predetermined time window are of substantially equal duration and occur back-to-back; and wherein said detecting of said first amount of light and said detecting of said second amount of light occurs at respective ones of said at least two charge storage wells, wherein if said object is present at a distance corresponding to a round-trip time-of-flight delay exceeding the duration of said first predetermined time window, the storage well accumulating said first amount of electrical charge accumulates the ambient light and the noise contributions only, wherein the processing means is configured to calculate said distance to said object at least based on the first amount of electrical charge and the second amount of electrical charge accumulated only during the first predetermined time window and the second predetermined time window.

6. The method according to claim 5, wherein said projecting, said detecting, and said calculating are repeated periodically.

7. A computer program product comprising code means configured to cause a processor to carry out the method according to claim 5.

8. A computer program product comprising code means configured to cause a processor to carry out the method according to claim 6.

* * * * *